(No Model.)
G. F. SIMONDS.
BALL BEARING.
No. 449,964. Patented Apr. 7, 1891.
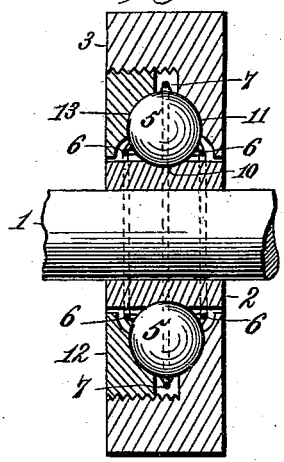
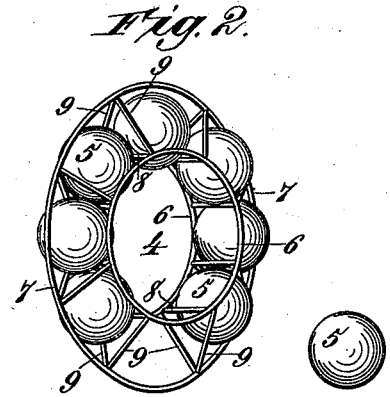
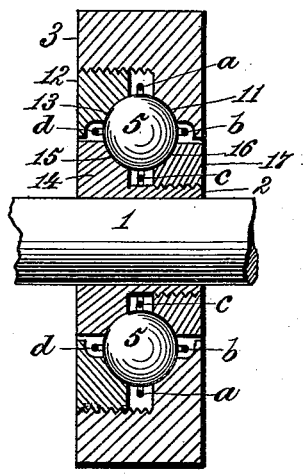
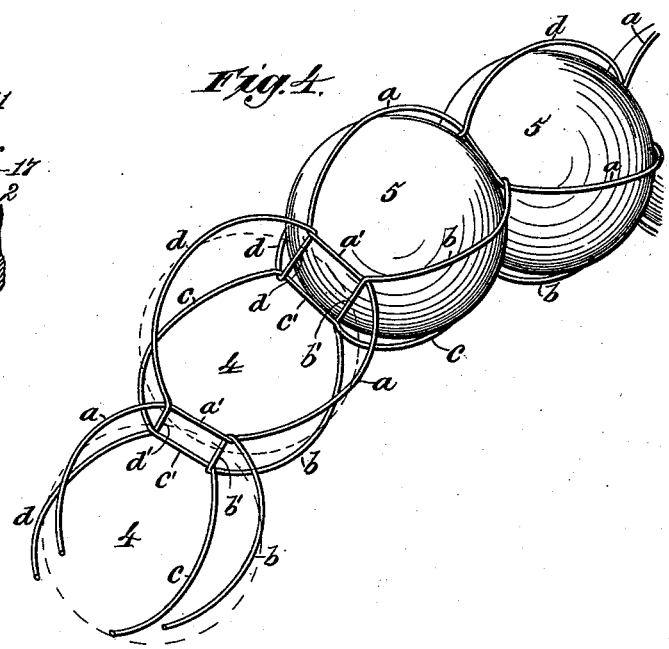
Witnesses:
Robt Emmitt
J. A. Rutherford
Inventor:
George F. Simonds
By James L. Norris
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 449,964, dated April 7, 1891.

Application filed December 30, 1890. Serial No. 376,290. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to that class of ball-bearings in which a number of spherical rollers or balls are employed to diminish friction.

The invention consists in the combination, with such spherical rollers or balls, of a cage composed wholly of wire and adapted to confine the balls in such a manner that they can be readily and quickly applied and removed in a body, and so that when inserted in a bearing the balls will be free to perform their proper functions, while the lightness and absence of bulk in the cage especially adapt it to employment in the bearings of pulleys, bicycle-wheels, roller-skates, the hubs of light carriage-wheels, and many other situations where economy of space is desirable.

In the annexed drawings, illustrating the invention, Figure 1 represents a portion of a shaft or axle in side elevation with a wheel, pulley, wheel-hub, or other rotating part and its bearing in section, showing the manner of applying a wire cage and inclosed balls. Fig. 2 is a perspective of wire cage and confined balls, one of the balls being removed to show the construction of the cage more clearly. Fig. 3 is a view similar to Fig. 1, but showing a modification in the construction of the wheel or pulley bearing to adapt it to the application of a modified form of wire cage. Fig. 4 is an enlarged perspective of a portion of a wire cage composed of an interlacing network of wires.

Referring to the drawings, the numeral 1 designates a shaft or axle having fast thereon a sleeve or collar 2, that is surrounded by the rotating part 3, which may be a wheel or pulley, or a wheel-hub, or the roller of a roller-skate or any rotary body.

Between the fixed sleeve or collar 2 and the rotating part 3 is placed a light wire cage 4, which may be made in either of the forms shown in Figs. 2 and 4, or in any other suitable form adapted to receive and retain the spherical rollers or balls 5 in position to sustain pressure or weight and diminish friction.

The wire cage shown in Figs. 1 and 2 is triangular in cross-section and comprises two parallel or corresponding inner wire rings 6, an outer centrally-arranged or peripheral wire ring 7, and the wire braces 8 and 9, arranged at suitable intervals in such a manner as to connect and brace the rings 6 and 7 and form separate chambers or receptacles for the spherical rollers or balls. As shown in Fig. 2, the wire braces 8 are extended transversely between and secured to the inner wire rings 6, and form the bases of a series of triangles, in which the sides are formed by the converging or diagonally-arranged outer wire braces 9, that are secured to and connect the wire rings 6 and 7 of the annular cage. The triangularly-arranged braces 8 and 9 alternate with the spherical rollers or balls 5, and, together with the inner wire rings 6 and outer wire ring 7, they form a series of compartments or receptacles in which the balls are separately retained. In this form of annular wire cage, which is triangular in cross-section, as described, the axle collar or sleeve 2 is preferably made plain, as shown in Fig. 1, but provided with a central annular groove or depression 10 to afford a suitable bearing for the circular series of balls. The wheel, disk, pulley, or other rotary part 3 may be permanently closed on one side adjacent to the sleeve or collar 2, and is provided internally with an annular depression 11 to accommodate the balls. After the cage of balls is put in place the other side of the disk, wheel, or rotary part 3 is closed by a ring 12, that is screwed into said rotary part. This ring 12 is also provided internally with an annular depression 13, against which the balls fit, and they are thus held in position to sustain the radial pressure and take the end-thrust of the rotary part from either direction.

In Figs. 3 and 4 the wire cage 4 is four-sided and composed wholly of four wires $a$, $b$, $c$, and $d$, woven or interlaced at regular intervals in such a manner as to form a series of ball compartments or receptacles separated by rectangular frames or wire braces $a'$ $b'$ $c'$ $d'$, Fig. 4, that are integral with the four wires composing the cage. In this form of construction, when the wire cage is intended for use in circular bearing, it is preferably bent to annular form in such direction that the opposite sides of each ball-receptacle will be formed by two wires, while the top and bottom will be composed of two other wires. When bent or curved in this manner, each set of integral connecting-braces $a'\,b'\,c'\,d'$ forms a rectangular frame that presents its angles or corners at the opposite sides and at the top and bottom of the cage between successive and separate ball-receptacles. With this form of wire cage the shaft or axle 1, Fig. 3, is preferably provided with a sleeve or collar 2, that is L-shaped in cross-section or provided on one side with a flange 14, having an internal annular depression 15, which, together with the corresponding depression 13 of the ring 12, forms a lateral bearing for one side of the series of balls confined in the cage, while the opposite bearing is formed by the annular depression 11 of the rotary part 3 in conjunction with a corresponding depression 16 on the inner side of a ring 17, that is screwed onto the unflanged end of the fixed sleeve or collar. By means of the flanged sleeve or collar 2 and the opposite detachable rings 12 and 17 the four-sided annular wire cage, Fig. 3, can be readily inserted and removed, and the assembling of the rotary part 3 and its described accompaniments may be accomplished with ease. It will also be seen that when caged and arranged in this manner the balls are free to turn or rotate and are in position to take end-thrust from either direction, as well as to sustain the radial pressure, while they can at any time be removed and replaced in a body.

Although I have shown only a single series of spherical rollers or balls, it is obvious that two or more series can be readily caged in the same manner by increasing the capacity of the cage or by forming it with one or more additional series of compartments or ball-receptacles, or two or more similar cages may be braided or woven together to form a single cage adapted to receive several series of spherical rollers or balls.

What I claim is—

1. The combination, with spherical rollers or balls, of a ball-bearing cage constructed wholly of wire and provided with compartments to receive and retain said spherical rollers or balls in position to sustain pressure or weight and diminish friction, substantially as described.

2. The combination, with spherical rollers or balls, of a ball-bearing cage consisting of a net-work of interlaced wires forming compartments to receive and retain said spherical rollers or balls in position to diminish friction, substantially as described.

In testimony whereof I have hereunto set my hand and affixed my seal in presence of two subscribing witnesses.

GEO. F. SIMONDS. [L. S.]

Witnesses:
 JAMES L. NORRIS,
 JAMES A. RUTHERFORD.